United States Patent
Berger et al.

(10) Patent No.: US 8,994,561 B2
(45) Date of Patent: Mar. 31, 2015

(54) MODULAR DISPLAY SYSTEM FOR HELICOPTERS

(71) Applicant: Thales, Neuilly sur Seine (FR)

(72) Inventors: Jean-Paul Berger, Valence (FR); Laurent Laluque, Bordeaux (FR); Denis Bonnet, Bordeaux (FR)

(73) Assignee: Thales, Neuilly sur Seine (FR)

( * ) Notice: Subject to any disclaimer, the term of this patent is extended or adjusted under 35 U.S.C. 154(b) by 32 days.

(21) Appl. No.: 13/857,973

(22) Filed: Apr. 5, 2013

(65) Prior Publication Data

US 2013/0265177 A1 Oct. 10, 2013

(30) Foreign Application Priority Data

Apr. 6, 2012 (FR) ...................................... 12 01032

(51) Int. Cl.
*G01C 21/00* (2006.01)
*B64D 43/00* (2006.01)
*G01C 23/00* (2006.01)

(52) U.S. Cl.
CPC ................ *G01C 23/00* (2013.01); *B64D 43/00* (2013.01)
USPC ......................................... 340/971; 340/980

(58) Field of Classification Search
USPC .............. 340/945, 971, 995.26, 691.1, 691.4, 340/691.7, 693.9, 815.83, 815.86, 815.87, 340/953, 954, 973, 974, 977, 979, 980; 434/35, 44; 345/1.2, 1.3; 701/3; 359/630
See application file for complete search history.

(56) References Cited

U.S. PATENT DOCUMENTS

| | | | | |
|---|---|---|---|---|
| 5,224,861 | A * | 7/1993 | Glass et al. ...................... | 434/35 |
| 6,190,172 | B1 * | 2/2001 | Lechner ........................... | 434/44 |
| 6,405,107 | B1 * | 6/2002 | Derman ............................ | 701/3 |
| 6,532,146 | B1 | 3/2003 | Duquette | |
| 2012/0075120 | A1 | 3/2012 | Barbieri | |
| 2013/0188259 | A1 * | 7/2013 | Nakamura et al. ............ | 359/630 |

FOREIGN PATENT DOCUMENTS

WO WO 2012/025695 A1 3/2012

OTHER PUBLICATIONS

French Search Report for Counterpart French Patent Application No. 1201032, 7 pgs, (Jan. 22, 2013).

* cited by examiner

*Primary Examiner* — Van T. Trieu
(74) *Attorney, Agent, or Firm* — Blakely, Sokoloff, Taylor & Zafman LLP

(57) ABSTRACT

The general field of the invention is that of helicopter cockpit display systems. The system according to the invention comprises at least a first mobile display screen. Depending on the mission and in order to optimize the vision of the external landscape, the mobile screen or screens are moved so that they are either in the field of vision of the pilot, or out of his field of vision. The symbologies displayed are adapted according to the mission and to the position of the screen.

9 Claims, 2 Drawing Sheets

MODULAR DISPLAY SYSTEM FOR HELICOPTERS

BACKGROUND OF THE INVENTION

1. Field of the Invention

The field of the invention is that of display systems fitted in helicopter cockpits.

2. Description of the Prior Art

Cockpit display systems for helicopters are constituted by display screens disposed in front of the crew. There can therefore be from two to six screens per cockpit depending on the size of the helicopter and its use. The set of screens occupies the whole of the available width of the instrument panel. These so-called "Glass Cockpit" configurations are close to those used in the cockpits of civil aircraft. They make it possible to fly using instruments with a large display area, instrument flight being known by the acronym "IFR", standing for "Instrument Flight Rules".

However, in a helicopter, in good meteorological conditions, the pilot prefers visual flight known by the acronym "VFR", standing for "Visual Flight Rules". The pilot therefore wishes to have the largest possible vision of the external landscape. It is very clear that current installations mask all of the lower part of the external landscape without it being possible to overcome this very easily.

In order to improve the vision of the exterior, it is possible to produce vision spaces on the lateral sides of the instrument panel. However, this solution is not ideal insofar as, in order to have visual access to these spaces, the pilot must change his normal piloting position.

Another solution consists in installing cameras on the carrier and in displaying the captured images on display screens, thus reconstituting a synthetic image of the external landscape. However, the major disadvantage of this solution is the parallax that exists between the displayed image and the real image, which can be enormous and deceive the pilot in his appreciation of distance and of the position of external objects.

SUMMARY OF THE INVENTION

The system according to the invention does not have these disadvantages. The system comprises mobile and retractable display screens which the pilot can remove from his field of vision in order to have a view of the exterior. He can thus adapt the display area according to the operational context.

More precisely, the invention relates to a helicopter cockpit display system comprising at least a first flat display screen located in a first predetermined plane, characterized in that the display system comprises mechanical means arranged such that the said first flat display screen is mobile in translation in a predetermined direction in the said first predetermined plane over a first predetermined length.

Advantageously, the display system comprises a second flat display screen located in a second predetermined plane parallel with the first predetermined plane and the mechanical means are arranged such that the said second flat display screen is mobile in translation in the same predetermined direction in the said second predetermined plane over a second predetermined length.

Advantageously, the display system comprises a third flat display screen located in a third predetermined plane parallel with the first predetermined plane and the mechanical means are arranged such that the said third flat display screen is mobile in translation in the same predetermined direction in the said third predetermined plane over a third predetermined length.

Advantageously, there is at least one position of the second flat display screen where this second flat screen is masked by the first flat display screen. Similarly, there is at least one position of the third flat display screen where this third flat screen is masked by the first flat display screen.

Advantageously, the display system comprises at least one fixed flat display screen disposed in the centre of the display system.

Advantageously, the system comprises electronic means arranged in such a way as to display on the flat display screen or screens a predetermined symbology at least dependent on the position of each screen.

Advantageously, the mechanical means are slides upon which at least one of the display screens slides.

BRIEF DESCRIPTION OF THE DRAWINGS

The invention will be better understood and other advantages will become apparent on reading the following description given in a non-limitative way and with reference to the appended figures in which.

DETAILED DESCRIPTION

Figure 1:
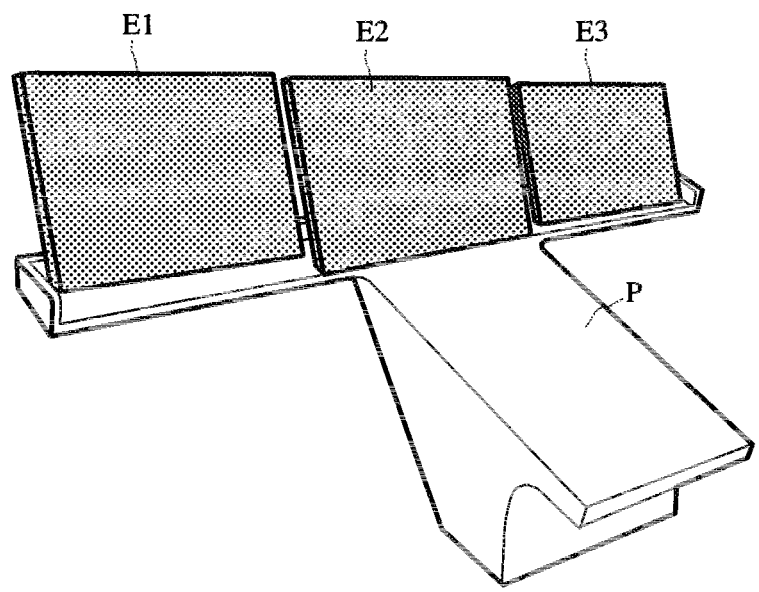
FIGS. 1 to 3 show a perspective view of a cockpit comprising a display system according to the invention in three different configurations, the first configuration called "IFR", the second configuration called "normal VFR", the third configuration called "degraded VFR".
Figure 2:
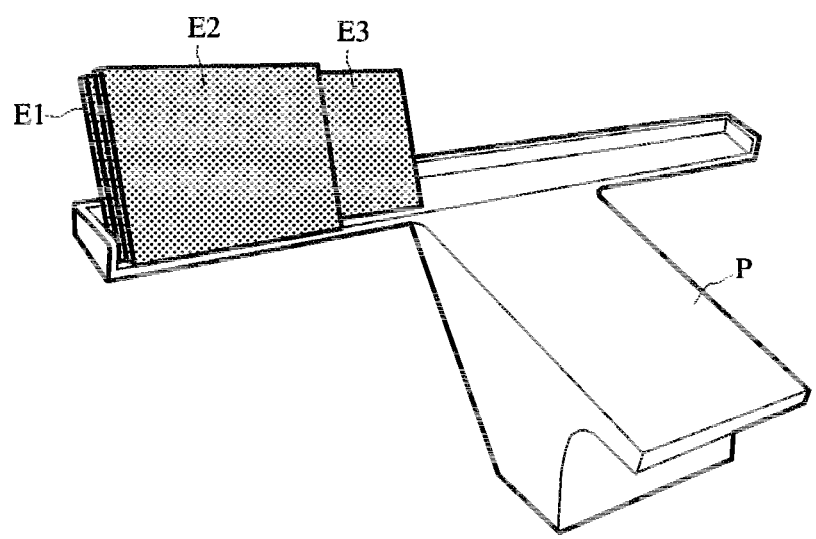
Figure 3:
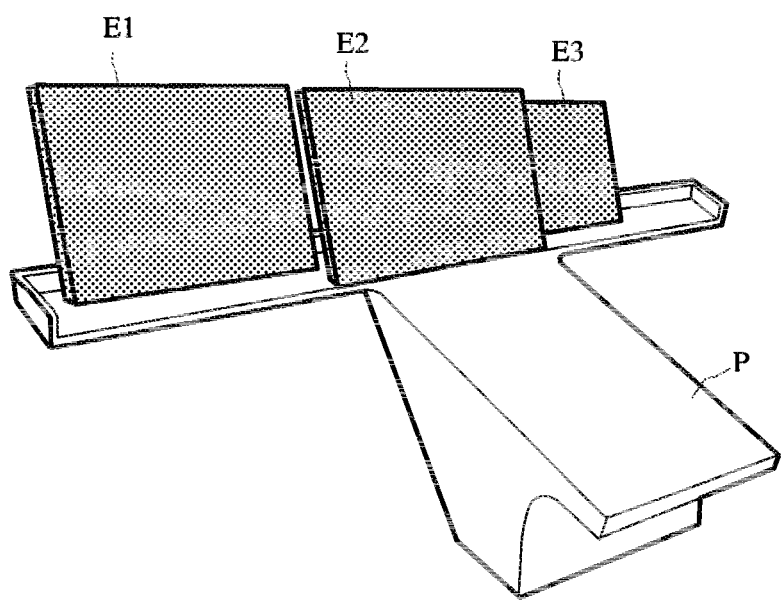

By way of non-limitative example, FIGS. 1 to 3 show a perspective view of a cockpit comprising a display system according to the invention. This cockpit is intended to be piloted by a crew of two persons, placed side by side, on either side of a central pedestal P. One of the crew members performs the piloting and the second member manages the mission.

In this example, the display assembly comprises three display screens E1, E2 and E3. The invention can of course equally apply to display assemblies comprising only one or two display screens or more than three display screens, some fixed, others mobile.

These display screens are flat screens having a small thickness not exceeding a few centimeters. These flat screens are, for example, liquid crystal screens, also known by the acronym "LCD (Liquid Crystal Display). They have substantially identical dimensions. These screens have widths and heights of several tens of centimeters.

The display system comprises three mobile screens mounted on parallel mechanical slides which simultaneously ensure their movement of translation, their guidance and the holding of them in a predetermined position. These sides are designed to produce a visual mask which is as small as possible as seen by the members of the crew. It is possible to replace the slides by any other mechanical system providing the same functions. It should be noted that the central display screen can be fixed. In these conditions, the peripheral mobile screens can move on telescopic slides masked by the central screen.

The movement of the screens can be provided manually by the users or can be controlled automatically by motorized means when commanded by the users or according to a pre-established program depending on the flight phase or on piloting or navigation conditions.

Each of the three mobile screens mobiles has several operational positions depending on the type of flight. FIGS. 1 to 3 show three possible configurations but other configurations can be envisaged according to the missions and flight conditions of the helicopter. It should be noted that, in these figures, only the positions of the screens are shown, the displayed symbologies are not shown. It should also be noted that the displayed symbologies can automatically depend on the position of the screen.

When the three mobile screens are fully deployed as shown in FIG. 1, the crew thus sees a "conventional" configuration with three screens disposed in line. This configuration is the one usually used for so-called "IFR" instrument flights. In this configuration, the two peripheral mobile screens E1 and E3 then display the same symbology which can comprise a synthetic representation of the external landscape and a specific piloting and navigation symbology, the central screen E2 then displaying a cartographic representation of the terrain flown over and information concerning the flight plan in progress.

The second configuration called VFR is shown in FIG. 2. The first mobile screen E2 is disposed in front of the crew member ensuring the mission. The second screen E3 is partially or totally visible. The third screen E1 is totally masked by the first two screens. The pilot thus has a completely clear field of vision of the exterior, providing him with optimum piloting conditions for visual flight. The first screen and the second screen then display the information essential for navigation or for the accomplishment of the mission.

The third configuration, called the "degraded VFR" configuration is shown in FIG. 3. The first mobile screen E1 is disposed in front of the crew member enduring the mission. The second screen E2 is disposed in the central part above the pedestal. The third screen E3 is partially deployed in front of the pilot. The pilot thus retains a good field of vision of the exterior whilst retaining piloting information. The first screen E1 displays a general status of the internal systems of the helicopter and in particular the failed or malfunctioning systems. The second screen E2 displays the navigation information. Finally, the third screen E3 displays piloting information.

The advantages of the display system according to the invention are essentially its simplicity of use and its high capabilities of adaptation and optimisation according to the mission, the flight conditions and the state of the aircraft.

What is claimed is:

1. A helicopter cockpit display system comprising at least a first flat display screen parallel with a first predetermined plane, wherein the display system comprises mechanical means arranged such that the first flat display screen is mobile in translation in a predetermined direction in the first predetermined plane over a first predetermined length, the movement of the first flat screen is provided manually or automatically by motorized means according to a pre-established program depending on a flight phase or on piloting or navigation conditions of the helicopter to modify a view of an exterior of the helicopter.

2. The display system according to claim 1, wherein the display system comprises a second flat display screen located in a second predetermined plane parallel with the first predetermined plane and in that the mechanical means are arranged such that the second flat display screen is mobile in translation in the same predetermined direction in the second predetermined plane over a second predetermined length, the movement of the second flat screen is provided manually or automatically by motorized means according to a pre-established program depending on the flight phase or on piloting or navigation conditions of the helicopter.

3. The display system according to claim 2, wherein the display system comprises a third flat display screen located in a third predetermined plane parallel with the first predetermined plane and in that the mechanical means are arranged such that the third flat display screen is mobile in translation in the same predetermined direction in the third predetermined plane over a third predetermined length, the movement of the third flat screen is provided manually or automatically by motorized means according to a pre-established program depending on the flight phase or on piloting or navigation conditions of the helicopter.

4. The display system according to claim 3, wherein there is at least one position of the third flat display screen where this third flat screen is masked by the first flat display screen.

5. The display system according to claim 3, wherein the display system comprises at least one fixed flat display screen disposed in the center of the display system.

6. The display system according to claim 3, wherein the system comprises electronic means arranged in such a way as to display on the flat display screen or screens a predetermined symbology at least dependent on the position of each screen.

7. The display system according to claim 3, wherein the mechanical means are slides upon which at least one of the display screens slides.

8. The display system according to claim 3, wherein:
when the helicopter is carrying out instrument flight rules (IFR) instrument flight, the three flat display screens are fully deployed;
when the helicopter is carrying out visual flight rules (VFR) visual flight, the first mobile display screen is disposed in front of a first crew ensuring the mission, the second display screen is partially or totally visible, the third screen is totally masked by the first two display screens;
when the helicopter is carrying out "degraded VFR" degraded visual flight, the first mobile display screen is disposed in front of a first crew ensuring the mission, the second display screen is disposed in the center of the three display screens, the third display screen is partially deployed in front of a second crew member providing the piloting.

9. The display system according to claim 2, wherein there is at least one position of the second flat display screen where this second flat screen is masked by the first flat display screen.

* * * * *